(12) United States Patent
Post et al.

(10) Patent No.: US 11,383,434 B2
(45) Date of Patent: Jul. 12, 2022

(54) FUSING THREE-DIMENSIONAL (3D) OBJECT LAYERS

(71) Applicant: HEWLETT-PACKARD DEVELOPMENT COMPANY, L.P., Spring, TX (US)

(72) Inventors: Alvin Post, Vancouver, WA (US); Brent Ewald, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,923

(22) PCT Filed: Jul. 31, 2018

(86) PCT No.: PCT/US2018/044688
§ 371 (c)(1),
(2) Date: Oct. 28, 2019

(87) PCT Pub. No.: WO2020/027819
PCT Pub. Date: Feb. 6, 2020

(65) Prior Publication Data
US 2021/0331384 A1    Oct. 28, 2021

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/209* (2017.08); *B29C 64/218* (2017.08);
(Continued)

(58) Field of Classification Search
CPC ... B29C 64/165; B29C 64/232; B29C 64/209; B29C 64/218; B29C 64/268; B29C 64/236; B29C 64/282; B33Y 10/00
See application file for complete search history.

(56) References Cited

U.S. PATENT DOCUMENTS

| | | | |
|---|---|---|---|
| 2001/0045678 A1 | 11/2001 | Kuto et al. | |
| 2005/0023719 A1* | 2/2005 | Nielsen | B29C 64/40 264/162 |
| 2017/0021418 A1* | 1/2017 | Ng | B33Y 10/00 |

FOREIGN PATENT DOCUMENTS

| | | | | |
|---|---|---|---|---|
| WO | WO2016048375 | | 3/2016 | |
| WO | WO-2016068899 A1 * | | 5/2016 | ............ B22F 1/0062 |

(Continued)

*Primary Examiner* — Leith S Shafi
*Assistant Examiner* — Xinwen Ye
(74) *Attorney, Agent, or Firm* — Dierker & Kavanaugh PC

(57) ABSTRACT

In an example, a method of fusing a 3D object layer with a stationary energy system positioned and a carriage that casts a shadow onto the work area includes, with one pass of the carriage moving over the work area at a constant speed, dispensing a liquid fusing agent onto a first layer of build material in a pattern corresponding to an object slice such that the exposure time of the patterned build material is unequal across the first layer and, with another pass of the carriage moving over the work area in the same direction and at the same constant speed as the first pass, spreading the next layer of build material over the first layer such that the exposure time of the patterned build material in the first layer is made equal across the first layer.

12 Claims, 14 Drawing Sheets

(51) Int. Cl.
  *B29C 64/282* (2017.01)
  *B29C 64/232* (2017.01)
  *B29C 64/209* (2017.01)
  *B29C 64/236* (2017.01)
  *B29C 64/268* (2017.01)
  *B29C 64/218* (2017.01)

(52) U.S. Cl.
  CPC .......... *B29C 64/232* (2017.08); *B29C 64/236* (2017.08); *B29C 64/268* (2017.08); *B29C 64/282* (2017.08); *B33Y 10/00* (2014.12)

(56) References Cited

FOREIGN PATENT DOCUMENTS

| WO | WO2016175748 | 11/2016 | | |
|---|---|---|---|---|
| WO | WO2017069778 | 4/2017 | | |
| WO | WO-2017127113 A1 | * 7/2017 | .......... | B29C 64/153 |
| WO | WO-2017142506 A1 | * 8/2017 | .......... | B29C 64/165 |
| WO | WO2017196358 | 11/2017 | | |
| WO | WO-2018075033 A1 | * 4/2018 | .......... | B29C 64/264 |

* cited by examiner

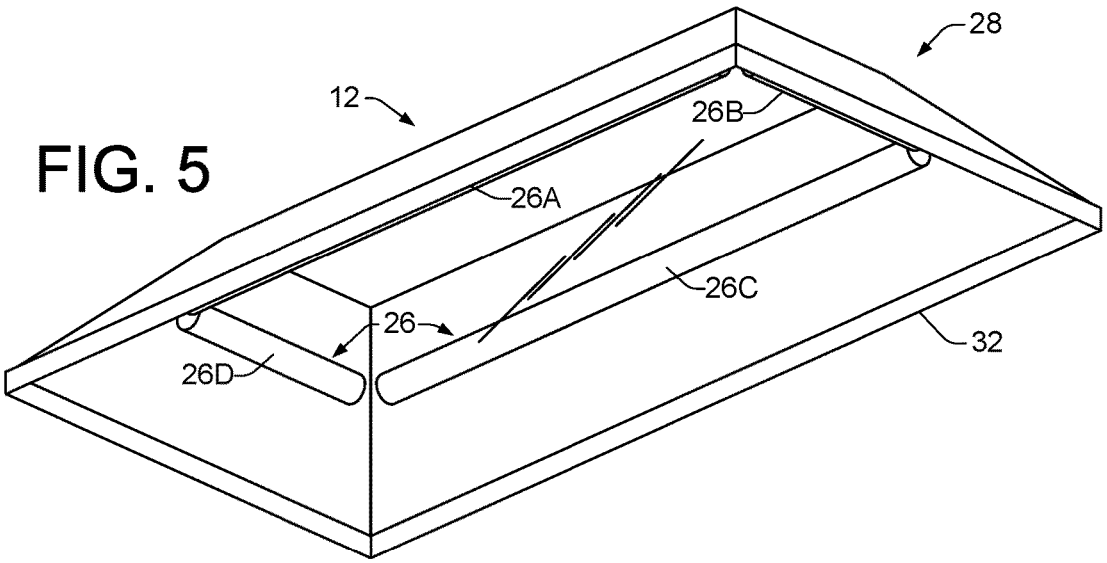
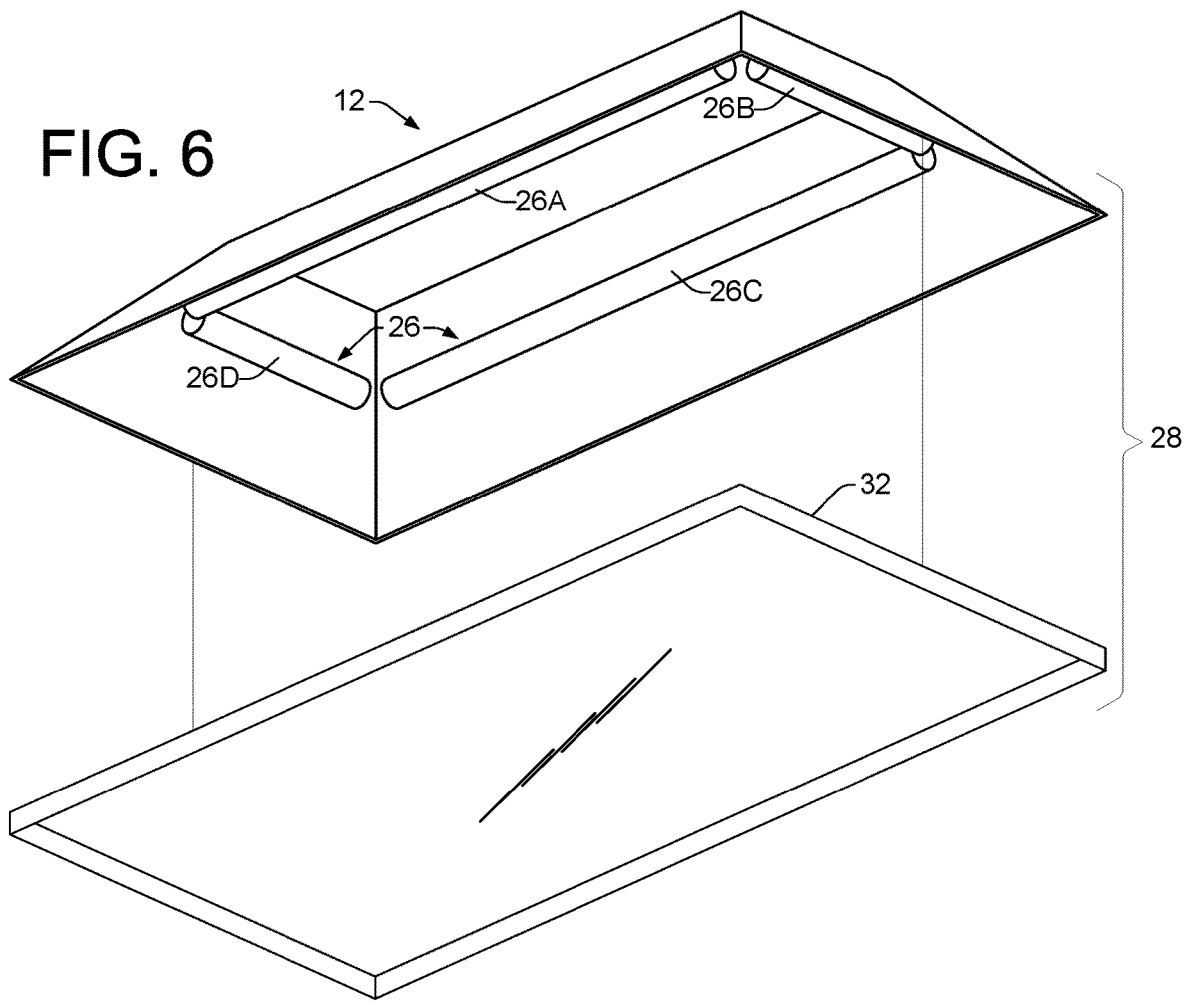

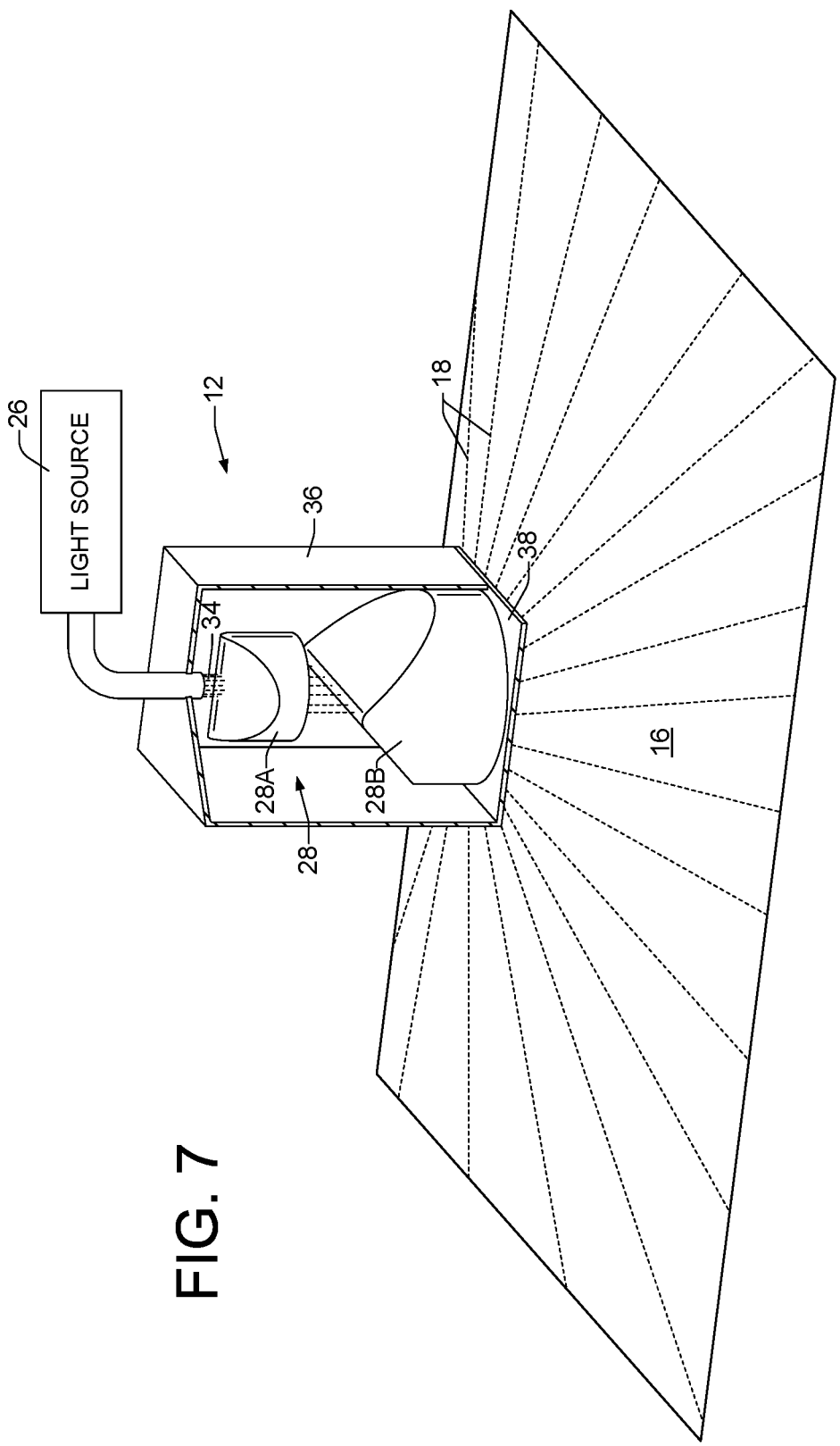

FUSING THREE-DIMENSIONAL (3D) OBJECT LAYERS

BACKGROUND

Additive manufacturing machines produce three-dimensional (3D) objects by layering and solidifying build material in the shape of the objects. 3D printers and other additive manufacturing machines convert digital representations of objects, such as CAD (computer aided design) models, into physical objects. Data defining an object model can be processed into slices that each define a portion or portions of a layer of build material to be formed into the physical object.

BRIEF DESCRIPTION OF THE DRAWINGS

Examples will now be described with reference to the accompanying drawings, in which:

FIGS. 5 and 6 illustrate another example of a lighting assembly for a fusing system such as the one shown in FIGS. 1 and 2;

FIG. 7 illustrates another example of a lighting assembly for a fusing system such as the one shown in FIGS. 1 and 2;

Throughout the drawings, identical reference numbers designate similar, but not necessarily identical, elements.

DETAILED DESCRIPTION

Figure 1:
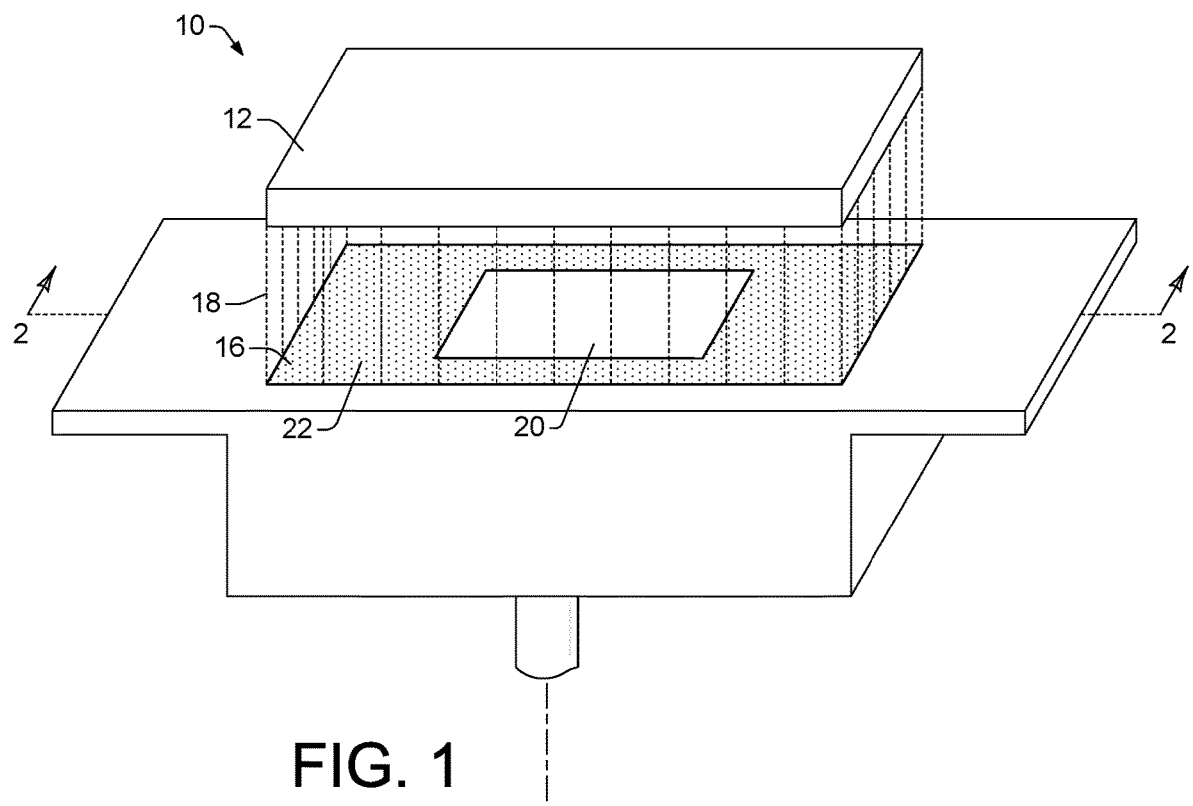
FIGS. 1 and 2 illustrate an example of a fusing system for an additive manufacturing machine.

Light is used in some additive manufacturing processes to melt, bind, or otherwise fuse together the particles in a build material, such as a powdered nylon build material. While processes described herein generally refer to the use of a powdered nylon build material, other forms and types of build materials may be appropriate including, for example, short fibers that have been cut into short lengths or otherwise formed from long strands or threads of material, and various powder and powder-like materials including plastics, ceramics, metals, and the like. In some examples, a suitable build material can include PA12 build material commercially known as V1R10A "HP® PA12" available from HP Inc.

In one example of a thermal fusing process, heat to fuse the build material is generated by applying a light absorbing liquid fusing agent to a thin layer of powdered build material in a pattern based on a corresponding object slice, and then irradiating (i.e. exposing) the patterned material with fusing light. The absorption of light by components in the fusing agent helps melt the build material. A layering process can repeat the thermal fusing process layer by layer and slice by slice to complete the object. A suitable fusing agent can include, for example, an ink-type formulation comprising carbon black, such as the fusing agent formulation commercially known as V1Q60A "HP® fusing agent" available from HP Inc. In different examples, fusing agent formulations can also comprise an infrared light absorber, a near infrared light absorber, a visible light absorber, and a UV light absorber. Inks comprising visible light enhancers can include dye based colored ink and pigment based colored ink, such as inks commercially known as CE039A and CE042A available from HP Inc. In some examples, a detailing agent can be dispensed onto selective areas of a build material layer, such as on and around object contours in order to cool the surrounding build material and prevent it from fusing into the object. An example of a suitable detailing agent can include a formulation commercially known as V1Q61A "HP® detailing agent" available from HP Inc.

In one example of a chemical binding process, the liquid fusing agent is a chemical binder applied to the build material to chemically bind the powder together in the desired pattern, and then exposing the patterned material to fusing light to dry and/or cure the binder agent. A layering process can repeat the chemical binding process layer by layer and slice by slice to complete the object. After separating the object from the unfused build material, the object may undergo subsequent heat treatment to obtain the final structural characteristics for the object.

In some examples, an additive manufacturing machine includes a non-scanning, stationary energy/lighting system positioned over the work area in a manner that simultaneously exposes/irradiates the entire work area uniformly with fusing light. In such examples, there may be less wasted light that falls outside the work area compared to scanning light systems. In one example, the non-scanning, stationary energy system includes a light source and an optic to distribute light from the light source uniformly over the work area. "Uniform" in this context means the irradiance (radiant flux per unit area) does not vary by more than 20% between any two locations within the work area. Modeling indicates that distributing fusing light uniformly over the work area from a stationary source can reduce power consumption and layer processing cycle time compared to scanning light systems. For some additive manufacturing fusing processes, thermal melting for example, it may be desirable to utilize a higher degree of uniformity, below 3% for example, for more efficient fusing. For other additive manufacturing fusing processes, chemical binding for example, a lower degree of uniformity, up to 20% for example, may be adequate for efficient fusing. The light source may be implemented, for example, as a lamp (or group of lamps) to emit incoherent light, a laser or other source to emit a beam of light, an array or arrays of LEDs, and/or plasma discharge flash tubes or other 'flash' systems. The optic may be implemented, for example, as a reflective hood covering a group of lamps to direct the light uniformly over the work area, or as a pair of Powell lenses to distribute a light beam uniformly over the work area.

While a stationary energy system can simultaneously irradiate the entire work area uniformly with fusing light, the amount of light reaching each portion of the work area may not be equal if the layering process is not designed properly and/or if the light is interrupted in an uneven manner during the process. Layering processes used in additive manufacturing machines involve the movement of carriages that momentarily interrupt or block the light from an overhead source as the carriages move from side to side over the work area. A carriage can carry components such as a material spreader (e.g., a roller) and a liquid agent dispenser over the work area.

Depending on how a layering process controls the movement of a carriage or carriages over the work area, the amount of time each side of the work area is exposed to light from a non-scanning, stationary energy system positioned over the work area may not be equal. In particular, the amount of exposure time for object layers spread over the work area may vary from one side of the work area to the other. Unequal exposure to light across the work area can cause object properties to vary from one side of the work area to the other, which can reduce the design margin available for object properties such as strength, elasticity, smoothness, and other properties. While some layer processing cycles have been optimized for use in additive manufacturing machines that use scanning light systems, such processes may not be as effective for use with a non-scanning, stationary energy/lighting system. The use of stationary lighting for irradiating energy during additive manufacturing fusing processes can be more effective when the layer processing cycles differ from those used in scanning light systems. Examples of layering processes described herein for use in additive manufacturing machines with non-scanning, stationary energy systems can provide substantially equal exposure times everywhere along the length of the work area. Such processes are scalable to larger work area sizes, unlike current layering processes used with scanning light systems.

These and other examples described below and shown in the figures illustrate but do not limit the scope of the patent, which is defined in the Claims following this Description.

As used in this document: "and/or" means one or more of the connected things; "light" means electromagnetic radiation of any wavelength; "non-scanning" means the thing does not scan across a work area or build platform in operation during fusing; "stationary" means the stationary thing does not move with respect to a work area in operation during fusing; irradiating a work area "uniformly" means the irradiance (radiant flux per unit area) does not vary by more than 20% between any two locations within the work area; and "work area" means that part of the surface of any suitable structure to support or contain build material for fusing, including underlying layers of build material and in-process object structures, within which an object is manufactured. In addition, a non-scanning, stationary energy/lighting system may be alternately referred to herein in a variety of similar ways, including as a stationary energy system, a stationary lighting system, a non-scanning stationary energy system, a stationary energy assembly, a stationary lighting assembly, and so on.

Figure 2:
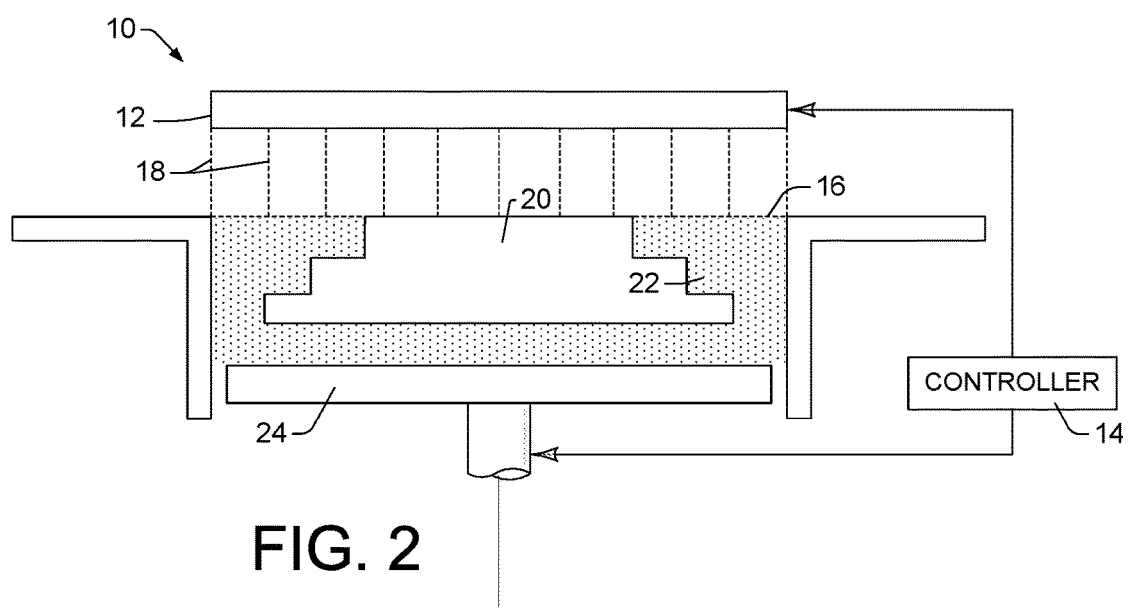

FIG. 1 illustrates one example of a fusing system 10 for an additive manufacturing machine. FIG. 2 is an elevation viewed along the line 2-2 in FIG. 1. Referring to FIGS. 1 and 2, fusing system 10 includes a non-scanning, stationary energy/lighting system 12 or assembly 12, and a controller 14. As noted above, "stationary" in this context means the energy/lighting system 12 does not move with respect to the work area in operation during fusing. The stationary energy system 12, however, does not have to be immovable. For example, the position of the stationary energy system, or components within the stationary energy system, may be calibrated or otherwise adjusted to maintain the desired lighting characteristics. The stationary energy system 12 and controller 14 are depicted generally by blocks 12, 14 in FIGS. 1 and 2.

Non-scanning, stationary energy system 12 is structured to simultaneously irradiate a work area 16 uniformly with fusing light 18 as controlled by the controller 14. In the example shown in FIGS. 1 and 2, the stationary energy system 12 is centered over work area 16. An object 20 is manufactured by fusing build material powder 22 in a succession of thin layers on a build platform 24 that is moved incrementally lower to accommodate each layer, at the direction of controller 14. Controller 14 represents processing and memory resources, programming, electronic circuitry, and other components for controlling the operative elements of system 10, including stationary energy system 12, build platform 24, a carriage 44 (see FIGS. 8-12) for moving a material spreader and liquid dispenser over the work area 16, the operation of the material spreader and liquid dispenser, and so on. In some examples, programming instructions executable by controller 14 control the operative elements of system 10 to perform various layering processes that can provide equal exposure time to the light 18 from a stationary energy system 12 everywhere along the length of the work area 16 from one side to the other, such as those discussed below with regard to FIGS. 13-18.

Figure 3:
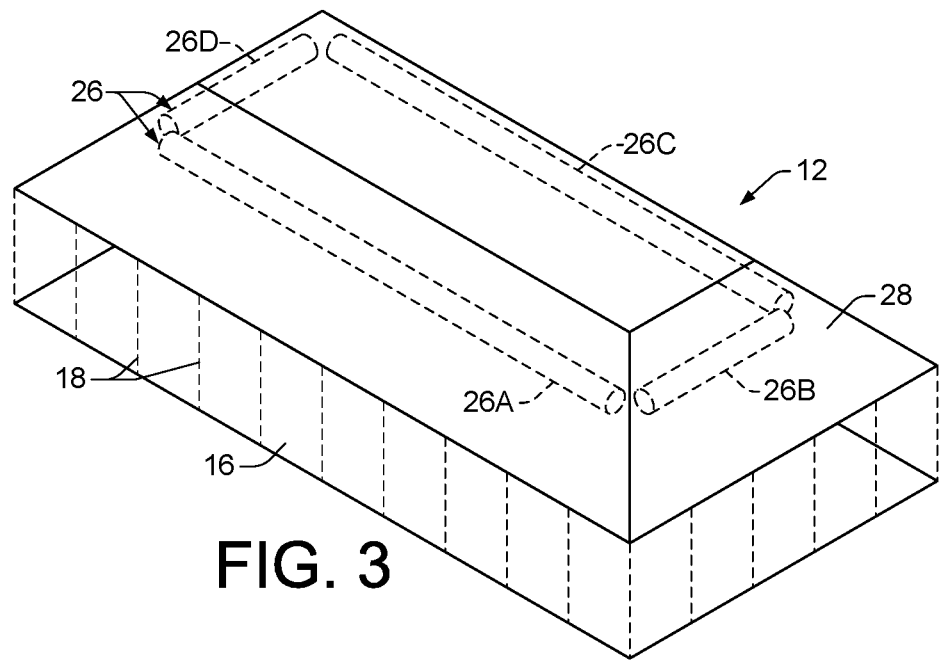
FIGS. 3 and 4 illustrate an example of a lighting assembly for a fusing system such as the one shown in FIGS. 1 and 2.
Figure 4:
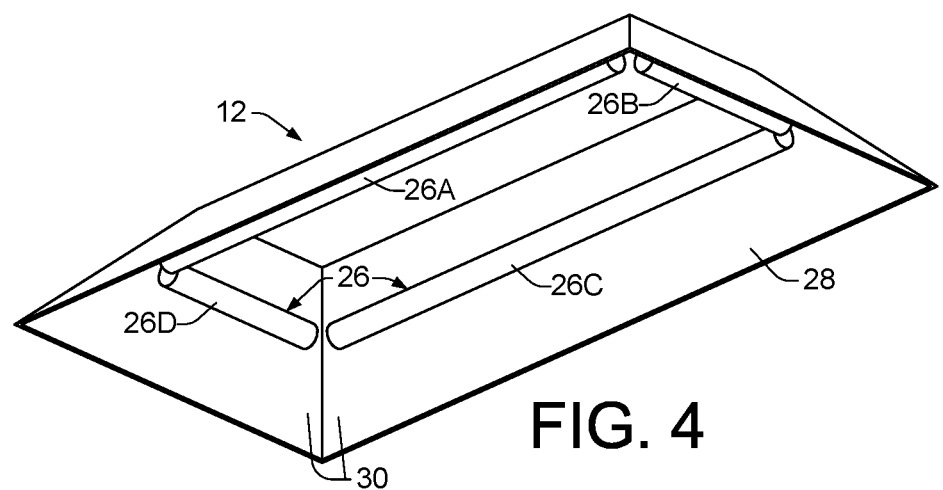

FIGS. 3 and 4 illustrate one example of a non-scanning, stationary energy system 12 for a fusing system 10 shown in FIGS. 1 and 2. Referring to FIGS. 3 and 4, stationary energy system 12 includes a light source 26 and an optic 28 to distribute light from light source 26 uniformly over work area 16 as fusing light 18. In this example, light source 26 is implemented as a group of lamps 26A, 26B, 26C, and 26D and optic 28 is implemented as a reflective hood 28 covering lamps 26A-26D. Also, in this example, cylindrical lamps 26A-26D are arranged along the perimeter 30 of a rectangular hood 28 shaped like a truncated pyramid. Some of the light from lamps 26A-26D is emitted directly on to work area 16 and some is reflected by hood 28 onto work area 16, as fusing light 18.

In another example, shown in FIGS. 5 and 6, stationary energy system 12 includes a transparent barrier 32 across the bottom of hood 28 to isolate the lamps from the surrounding environment while still allowing the distribution of fusing light 18.

FIG. 7 illustrates another example of a stationary energy system 12 for a fusing system 10 shown in FIGS. 1 and 2. Referring to FIG. 7, stationary energy system 12 includes a light source 26 and an optic 28 to distribute light from light source 26 uniformly over work area 16, as fusing light 18. In this example, light source 26 is implemented as a laser or other source of a light beam 34 and optic 28 is implemented as a pair of Powell lenses 28A, 28B oriented perpendicular to one another. Lenses 28A, 28B distribute light beam 34 uniformly over a rectangular work area 16 as fusing light 18. In this example, lenses 28A, 28B are housed in an enclosure 36 with a transparent floor 38 to isolate the lenses from the surrounding environment while still allowing the distribution of fusing light 18. Other suitable configurations for a stationary energy/lighting system 12 are possible.

The characteristics of the source 26 of fusing light 18 may vary depending on characteristics of the build material and fusing agent (and other fusing process parameters). For example, it is expected that a stationary energy system 12 arranged to emit a radiant flux energy of at least 5 J/cm$^2$ for fusing light 18 will be sufficient in many additive manufacturing applications that use a polyamide build material powder. In one specific example for a polyamide build material, a 2800W (total) light source 26 with an optic 28 configured to provide about 16 J/cm$^2$ for energy consumption at the work area will deliver fusing light 18 comparable to that delivered by a 4300W (total) scanning light source for similar manufacturing conditions. Also, a higher color temperature light source may be desirable to better match the spectral absorption of white or other light colored build material 22 treated with a black fusing agent or another high absorption type of fusing agent, such as a low-tint (or light colored) fusing agent, for more heating of the treated build material and less heating of the adjacent untreated build material. For example, a light source 26 operating in the range of 1500K to 3500K may be used to achieve the desired level of power absorption for effectively fusing a white build material 22 treated with a black fusing agent. In some additive manufacturing implementations using a stationary energy system 12 to generate fusing light 18, it may be desirable to also include warming lamps to help pre-heat the build material before applying a fusing agent.

Figure 8:
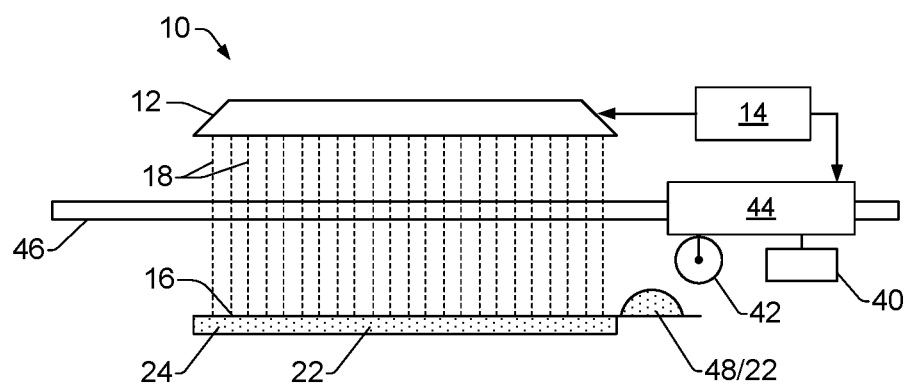
FIGS. 8 and 9 are elevation and plan views, respectively, illustrating one example of a fusing system for an additive manufacturing machine.
Figure 9:
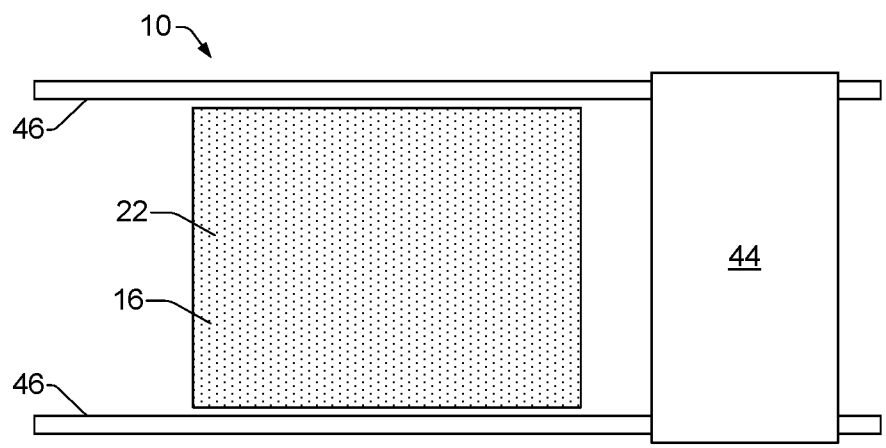
Figure 10:
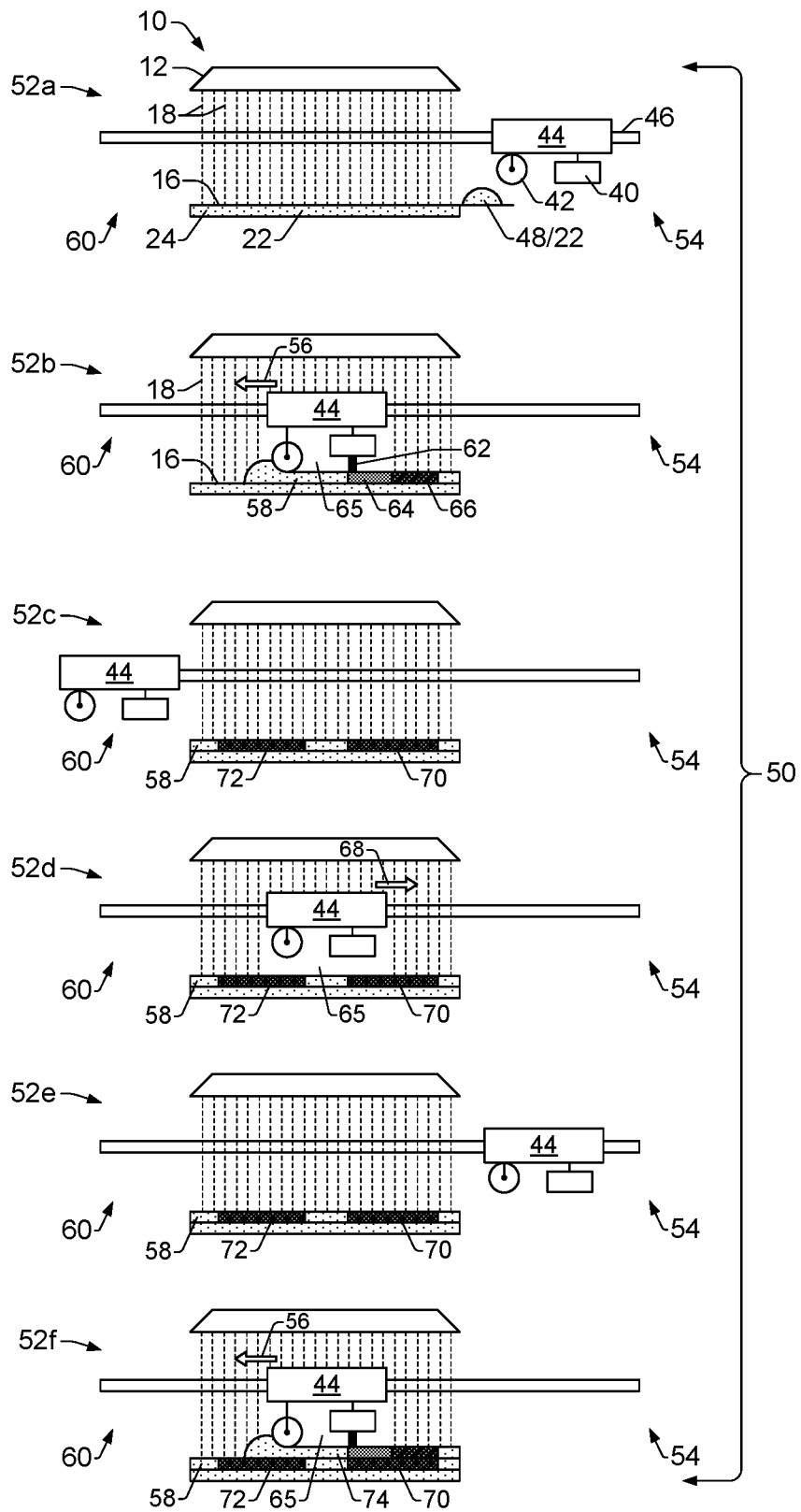
FIGS. 10, 11, and 12, each show example fusing systems during different layering processes designed for use in additive manufacturing machines with non-scanning, stationary energy systems; and, FIGS. 13-18 are flow diagrams showing example methods of fusing a 3D object layer.
Figure 11:
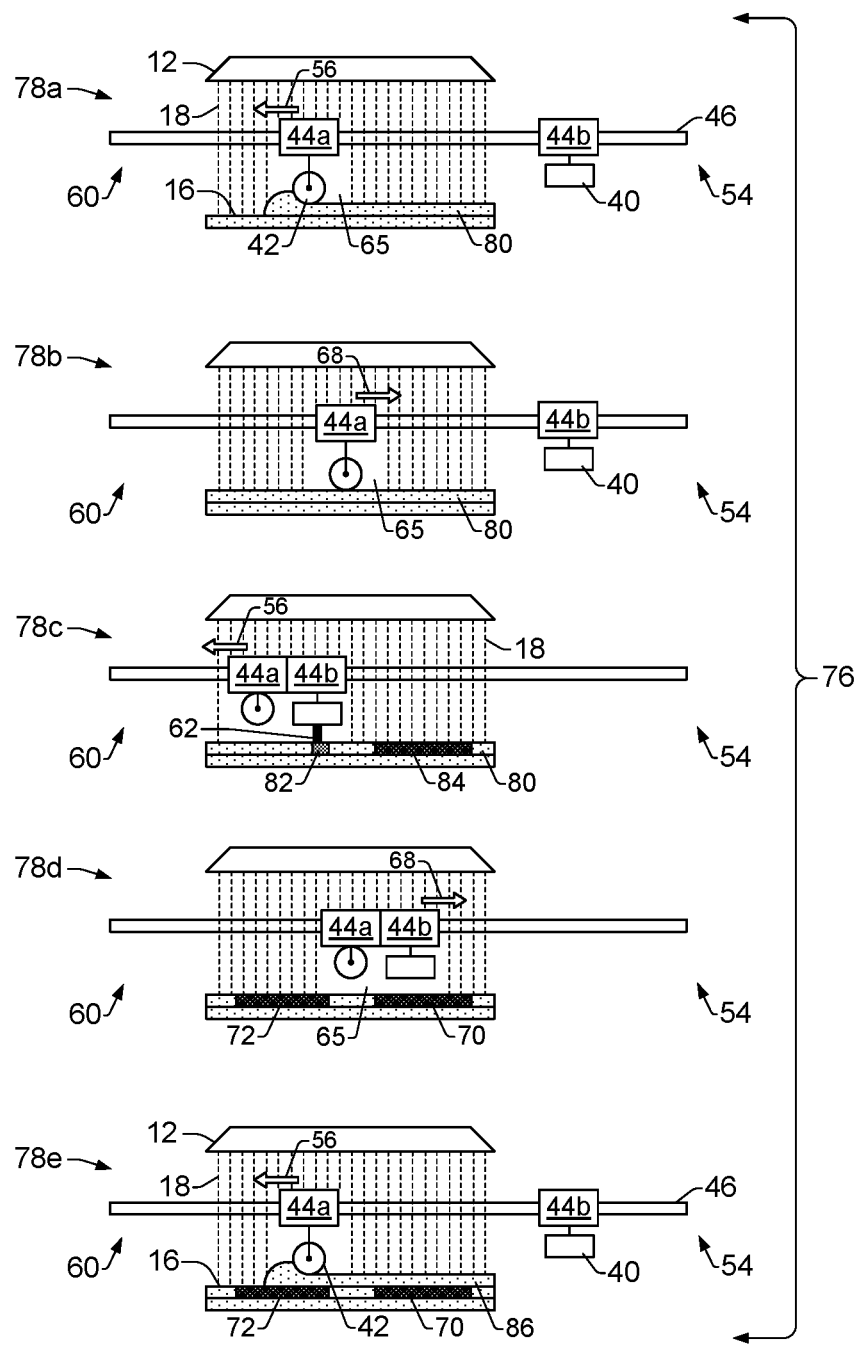
Figure 12:
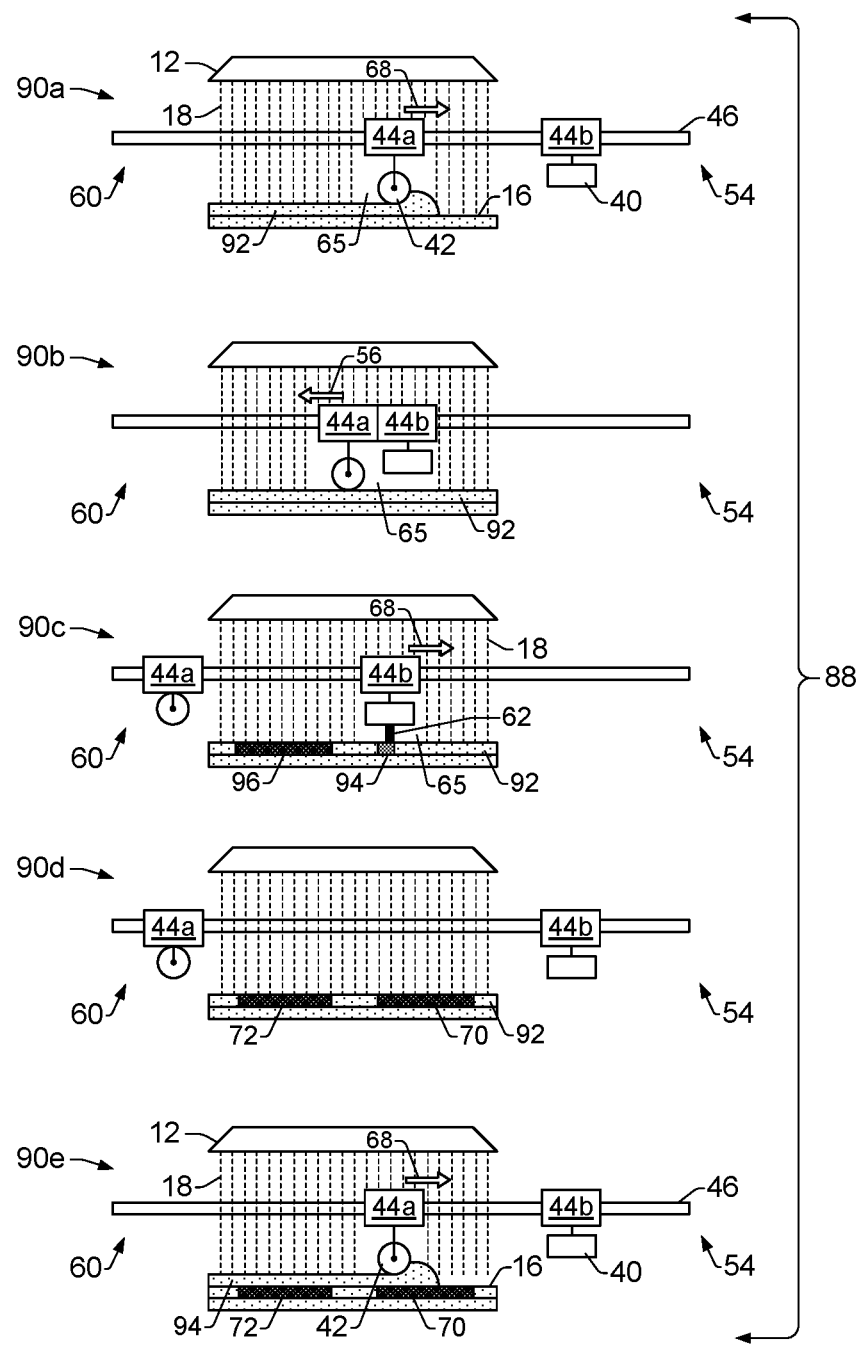

FIGS. 8 and 9 are elevation and plan views, respectively, illustrating one example of a fusing system 10 for an additive manufacturing machine. FIGS. 10, 11, and 12, each show a similar or same example fusing system 10 during different layering processes designed for use in additive manufacturing machines with non-scanning, stationary energy systems 12. Referring to FIGS. 8-12, example fusing system 10 includes a non-scanning, stationary energy system 12 positioned over a work area 16 and a liquid fusing agent dispenser 40 and layering device 42 carried by a carriage 44. A controller 14 to control the operative elements of fusing system 10 is shown in FIG. 8. Lighting assembly 12 is omitted from the plan view in FIG. 9 so as not to obscure the underlying work area 16. Lighting assembly 12 is structured to simultaneously irradiate the whole of work area 16 uniformly with fusing light 18. Lighting assembly 12 may be implemented as a light source 26 and optic 28, for example as shown in FIGS. 3-7.

Carriage 44 carries layering device 42 and liquid dispenser 40 over work area 16 on rails 46. Dispenser 40 may be implemented as an inkjet printhead (pen) 40 or other suitable liquid dispensing device, and may be referred to variously herein as a liquid dispenser 40, dispenser 40, dispensing pen 40, liquid fusing agent dispenser 40, and the like. Although a single dispenser is shown, more dispensers may be used to dispense a single agent or multiple agents. Build material 22 on which a liquid agent 62 has been dispensed may be alternately referred to herein, for example, as printed build material 64, inked build material 64, patterned build material 64, fused build material 66, and so on (e.g., see FIGS. 10-12). In the example shown in FIG. 8, layering device 42 is implemented as a spreading roller 42 that moves between a deployed position to layer build material as carriage 44 moves over work area 16, and a retracted position to not layer build material as carriage 44 moves over work area 16. Other implementations for a layering device 42 are possible including, for example, a blade or a device that spreads build material in a layer directly over the work area.

In FIGS. 8 and 9, carriage 44 is parked on the right side of work area 16 with roller 42 in a retracted position. The roller 42 can be deployed in preparation for spreading a supply 48 of build material powder 22 next to the work area 16 over the build platform 24 of work area 16 as a layer. If a previous layer has been spread, the roller 42 can spread the supply 48 over the previous layer of build material powder 22. To simplify this description and the illustrations in FIGS. 8-12, the work area 16, the build platform 24, and a previous layer of build material 22, may be referenced together or separately in the description and/or the FIGs. depending on the current context. That is, reference to the work area 16, for example, may include reference to a layer of build material 22 currently spread over the work area 16.

In the examples shown in FIGS. 8-12, the right side of the work area 16 can be considered to be the "pen side" or "pen servicing side" and/or capping station side of the work area 16 where the liquid dispenser 40 or dispensing pen 40 can be serviced and capped when not in use. While the current examples show the pen servicing side on the right side of the work area 16, in other examples the pen servicing side can be on the left side of the work area 16. In either case, however, for the purposes of the layering processes described herein, the orientation of the roller 42 and the dispensing pen 40 to the work area 16 should be as shown in FIGS. 8-12. That is, whenever the roller 42 and dispensing pen 40 are in a parked position on the pen servicing side of the work area 16, the roller 42 is positioned next to the work area 16, in between the work area 16 and the dispensing pen 40. Thus, if the pen servicing side of the work area 16 is on the right side as shown in the current examples of FIGS. 8-12, then the roller 42 is to the right of the work area 16 and the dispensing pen 40 is to the right of the roller 42 when the roller 42 and dispensing pen 40 are parked on the pen servicing side. However, in other examples where the pen servicing side is on the left side of the work area 16, then the roller 42 is to the left of the work area 16 and the dispensing pen 40 is to the left of the roller 42 when the roller 42 and dispensing pen 40 are parked on the pen servicing side. In general, maintaining this orientation of the roller 42 to the dispensing pen 40 while spreading build material powder 22 from the "pen servicing side" can better facilitate an equal amount of exposure time to fusing light 18 from the stationary energy system 12 for objects being made on both the right and left sides of the work area 16. Conversely, spreading build material powder 22 from the side opposite the pen servicing side (i.e., the "non-servicing side") with this orientation of the roller 42 and dispensing pen 40 can cause unequal exposure times to fusing light 18 across the work area 16 which can result in different object fusing times from side to side across the work area 16. In general, layering processes described herein for use in additive manufacturing machines with a stationary energy system 12 spread build material powder from the pen servicing side to facilitate equal fusing and heating times across the length of the work area 16, which improves design margin and scalability in the size of the work area 16.

Referring now to FIGS. 10-12, example layering processes are shown for additive manufacturing machines that use non-scanning, stationary energy systems 12. The example layering processes shown in FIGS. 10-12 result in a uniform distribution of fusing light/energy 18 being applied to the work area 16, or to layers of build material spread over the work area 16, with the entirety of the work area 16 or of each build material layer from one side to another being exposed to the light 18 for an equal amount of time. That is, the example layering processes operate so that the total illumination time or exposure time is the same all across a build material layer, from one side to the other, especially with respect to areas of a layer that have been printed on with liquid fusing agent. The processes help to ensure that objects formed on either side of the work area receive equal fusing energy from the stationary energy system 12. The fusing systems 10 shown in FIGS. 10-12 are configured in the same general way as in FIGS. 8 and 9. However, for the sake of simplifying the illustrations, some elements such as controller 14 are not shown in FIGS. 10-12.

Each of the layering processes shown in FIGS. 10-12 includes a number of processing stages. For example, as shown in FIG. 10, an example layering process 50 can include a number of processing stages 52 (illustrated as stages 52a, 52b, 52c, 52d, 52e, 52f). In a first processing stage 52a, the carriage 44 is parked on the right side 54, or pen servicing side 54, of the work area 16 with layering roller 42 in a retracted position on the carriage 44. The roller 42 can move downward into a deployed position for spreading a layer of build material powder 22 as shown in processing stage 52b. A supply 48 of build material powder 22 is provided next to the work area 16 in preparation for spreading a layer, such as a first layer, or a next layer in a first pass of the carriage 44 over the work area 16. Herein, a layer may be referred to as a first layer merely for the purpose of providing a starting point for describing and illustrating a layering process such as layering process 50. Thus, a layer referred to as being a first layer may not actually be the first layer of an object being formed, but may instead be a next layer or any layer number within the object being formed.

In processing stage 52b, during a first pass of the carriage 44 over the work area 16 from the right or pen service side 54, to the left or non-service side 60 (indicated by direction arrow 56), the deployed roller 42 spreads the layer 58. Also during this first pass, a liquid fusing agent 62 is dispensed from dispenser 40 onto layer 58 in a pattern 64 corresponding to an object slice. Patterned build material 64 irradiated with fusing light 18 behind the carriage 44 fuses to form fused build material 66.

As shown in each of the processing stages 52 of layering process 50, the entirety of the work area 16 is simultaneously, uniformly, and continually irradiated with fusing light 18 except when the light is blocked by the carriage 44. As shown in stage 52b, when the carriage 44 moves from right to left in a first pass over the work area 16, the carriage 44 blocks the fusing light 18 from reaching the work area 16 and/or any portion of a layer 58 being spread over the work area 16. The carriage 44 casts a shadow 65 onto a portion of the work area 16 when it is positioned between the fusing light 18 from stationary energy system 12 and the work area 16. The cast shadow 65 comprises a region where fusing light 18 does not directly irradiate the work area 16. There can be some very small amount of light that can reflect or scatter from the work area 16 (e.g., the powder layer 58), to the bottom of the carriage 44, and back down to the work area 16. However, this amount of light is negligible and has a negligible effect on heating or fusing build material in the work area 16.

Because liquid fusing agent 62 is dispensed from dispenser 40 as the carriage 44 moves from right to left at a substantially constant speed, at the completion of stage 52b the printed build material 64/66 on the right side of layer 58 of work area 16 has been exposed to fusing light 18 for a longer amount of time than printed build material on the left side of the layer 58. As noted below, this inequity in exposure time is made up for, or balanced out, in a subsequent processing stage 52f as a next layer is spread over the work area 16. Also, as shown in stage 52d, as the carriage 44 moves back over the work area 16 to the right side 54, it blocks the fusing light 18 from reaching the work area 16 and/or any portion of the layer 58, such as objects 70 and 72. However, in stage 52d, the blockage of light 18 by carriage 44 is the same across the layer 58 so it does not contribute to uneven exposure time from the light 18. In some examples, the speed of the carriage 44 can be adjusted during a processing stage and/or between processing stages to manipulate the fusing light 18 exposure time provided across the work area 16, or from side to side on a layer or the work area 16. Such carriage speed adjustments may be appropriate, for example, in circumstances where the power from a fusing lamp 26 is not constant. Thus, for example, adjusting the speed of the carriage 44 to provide additional fusing time can compensate for reduced energy from a low powered fusing lamp 26.

Still referring to the example layering process 50 in FIG. 10, as shown in processing stage 52c, after the first pass the carriage 44 reaches the left or non-service side 60 of the work area 16 and the roller 42 is retracted back to the carriage 44 where it cannot come in contact with the layer 58. In addition, while the carriage 44 is on the non-service side 60 of the work area 16, the fusing light 18 continues to irradiate the now fully exposed layer 58. In some examples, the carriage 44 can be parked on the non-service side 60 for a delay period in order to provide additional time for the exposed layer 58 to be irradiated with fusing light 18. Such a delay can allow adequate time to achieve the desired reptation of fused build material 66. Inserting such a delay period into the layering process 50 may be appropriate, for example, in circumstances where there is a reduced power level from lamps 26 within the stationary energy system 12. In general, there is a carriage turn-around delay time built in to the process that can be on the order of hundreds of milliseconds during which the carriage 44 speed ramps down in the direction indicated by arrow 56, and then speeds back up in the direction indicated by arrow 68 shown in processing stage 52d. The deceleration and acceleration of the carriage in either direction (i.e., as indicated by arrows 56 and 68) as it approaches and moves away from either side of the work area is substantially the same during normal operation, and therefore has a negligible impact on exposure time of the layer 58 build material to the fusing light 18. In some examples, however, the deceleration and/or acceleration of the carriage can be adjusted to help control (e.g., equalize) exposure time across the layer 58.

As shown in processing stage 52d, the carriage 44 moves in a second pass over the work area 16 from the left or non-service side 60 back to the right or pen service side 54, as indicated by the direction arrow 68. The carriage 44 can then be parked on the pen service side 54 as shown in processing stage 52e, and/or it can be prepared to spread a next layer 74 as shown in processing stage 52f. Preparation to spread a next layer 74 can occur, for example, during a brief carriage turn-around delay that can include the deposition of a new supply 48 of build material powder 22 next to the work area 16 and the deployment of the roller 42 into a spreading position. After processing stage 52d is complete, because of the way liquid fusing agent 62 is dispensed from the carriage 44 in stage 52b from the right side 54 to the left side 60 as noted above, the object 70 on the right side or pen service side 54 has been exposed to fusing light 18 for a longer amount of time than the object 72 on the left side 60.

The unequal exposure to fusing light 18 across the first layer 58 between the right side object 70 and the left side object 72, is evened out or balanced during processing stage 52f in a third pass over the work area 16 as a next layer 74 is spread by deployed roller 42. During this third pass, the left side object 72 of the first layer 58 continues to receive fusing light 18 while the right side object 70 is being covered with the next layer 74. This additional exposure time to the left side object 72 of the first layer 58 in the third pass, stage 52f, balances out the additional exposure time to the right side object 70 for the first layer 58 from the first pass in stage 52b. Balancing out the exposure time between the right side object 70 and left side object 72 in the third pass assumes that the speed of the carriage over the work area is substantially the same in the first and third passes. However, in some examples carriage speed adjustments can be made during a pass to provide additional fusing time to either side of the work area to compensate, for example, for unequal exposure times, unequal fusing lamp power, and so on.

Referring to FIG. 11, another example layering process 76 is shown. In layering process 76, the layer spreading roller 42 and liquid dispenser 40 can move over the work area 16 independent of one another and are on separate carriages 44 (illustrated as layer spreading carriage 44a and liquid dispensing carriage 44b). Layering process 76 includes a number of processing stages 78 (illustrated as stages 78a, 78b, 78c, 78d, 78e). In a first processing stage 78a, the roller 42 carried on carriage 44a is moved into a deployed position on the carriage 44a, and the carriage 44a makes a first pass over the work area 16 in the direction indicated by arrow 56, which moves it from the right side, or pen service side 54, over to the left side, or non-service side 60. During the first pass, the roller 42 remains in the deployed position on the carriage 44a and spreads the layer 80 of build material over work area 16. During the first pass, the dispenser 40 carried on carriage 44b remains parked on the pen service side 54. When the first pass is complete, the roller 42 remains in the deployed position and the carriage 44a moves back across the work area 16 to the pen service side 54 in a second pass, as shown in processing stage 78b. During the second pass, the deployed roller 42 provides a second spreading pass over the layer 80, and the dispenser 40 on carriage 44b remains parked on the pen service side 54. In general, additional spreading passes over build material layers can further compact the build material and provide improved reptation during fusing. In some examples, the roller 42 on carriage 44a can be parked on the non-service side 60 after the first pass, and/or on the pen service side 54 after the second pass, for a warming delay period that provides additional time for fusing light 18 to warm layer 80 in preparation for fusing.

In a next processing stage 78c, the roller 42 and dispenser 40 move together on respective carriages 44a and 44b in a third pass across the work area 16 in the direction indicated by arrow 56, which moves the carriages from the right side, or pen service side 54, over to the left side, or non-service side 60. Prior to beginning the third pass, the roller 42 is moved to a retracted position on the carriage 44a so it does not contact the layer 80 during the third pass. During the third pass, the dispenser 40 dispenses liquid fusing agent 62 onto layer 80 in a pattern 82 corresponding to an object slice. Patterned build material 82 irradiated with fusing light 18 behind the carriage 44b fuses to form fused build material 84. When the third pass is complete, the roller 42 remains in the retracted position and the roller 42 and dispenser 40 move together on respective carriages 44a and 44b in a fourth pass across the work area 16 in the direction indicated by arrow 68, which moves the carriages back to the pen service side 54 from the non-service side 60, as shown in processing stage 78d.

In some examples, the carriages 44a and 44b can be parked on the non-service side 60 for a delay period after the third pass shown in processing stage 78c. Likewise, the carriages 44a and 44b can be parked on the pen service side 54 for a delay period after the fourth pass shown in processing stage 78d. Parking the carriages provides additional time for the exposed layer 80 to be irradiated with fusing light 18 which can enable adequate time to achieve a desired reptation of fused build material 84. Inserting such a delay period into the layering process 76 may be appropriate, for example, in circumstances where there is a reduced power level from lamps 26 within the stationary energy system 12.

In a manner similar to that discussed above with regard to layering process 50 (FIG. 10), after the third pass shown in processing stage 78c of layering process 76 (FIG. 11), the amount of fusing energy/light 18 the right side object 70 has received is greater than the amount of fusing energy/light 18 the left side object 72 has received. The non-uniform exposure is due to the liquid fusing agent 62 being dispensed from the right side 54 to the left side 60 and the fusing light 18 being blocked by carriages 44a and 44b. This non-uniform exposure to fusing light 18 across the first layer 80, between the right side object 70 and the left side object 72, is evened out or made uniform during processing stage 78e in a fifth pass over the work area 16 as a next layer 86 is spread by deployed roller 42. During this fifth pass, the left side object 72 continues to receive fusing light 18 while the right side object 70 is being covered with the next layer 86. At constant pass-over carriage speeds, and constant fusing lamp 26 power, the reduced amount of fusing light exposure the left side object 72 received in the third pass compared to the right side object 72, is made up for, or evened out during the fifth pass. The layering process 76 shown in FIG. 11 can continue in this manner until the object is completed.

Referring to FIG. 12, another example layering process 88 is shown. In layering process 88, the roller 42 and liquid dispenser 40 can move over the work area 16 independent of one another and are on separate carriages 44 (illustrated as carriages 44a and 44b). Layering process 88 includes a number of processing stages 90 (illustrated as stages 90a, 90b, 90c, 90d, 90e). In a first processing stage 90a, the carriage 44a carrying the roller 42 begins from the non-service side 60 of the work area 16 and makes a first pass over the work area 16 in the direction indicated by arrow 68, which moves it from the left side, or non-service side 60, over to the right side, or pen service side 54. During the first pass, the roller 42 is in a deployed position on the carriage 44a and is spreading the layer 92. During the first pass, the dispenser 40 carried on carriage 44b remains parked on the pen service side 54. When the first pass is complete, the roller 42 remains in the deployed position and the carriages 44a and 44b move back across the work area 16 to the non-service side 60 in a second pass, as shown in processing stage 90b. During the second pass, the deployed roller 42 provides a second spreading pass over the layer 92. Additional spreading passes over build material layers can further compact the build material and provide improved reptation during fusing. In some examples, as shown in processing stage 90b, the dispenser 40 does not dispense liquid fusing agent onto the layer 92 during the second pass. In some other examples, the dispenser 40 can dispense liquid fusing agent onto the layer 92 during the second pass. In some examples, the carriages 44a and 44b can be parked on the non-service side 60 after the second pass for a warming delay period that provides additional time for fusing light 18 to warm layer 92 in preparation for fusing.

In a next processing stage 90c, the roller 42 is moved to a retracted position on the carriage 44a, and the carriage 44a and roller 42 remain parked on the non-service side 60 of the work area 16. In addition, a third pass is made over the work area 16 with the dispenser 40 on carriage 44b in the direction indicated by arrow 68, which moves the dispenser 40 and carriage 44b from the left side, or non-service side 60, over to the right side, or pen service side 54. During the third pass, the dispenser 40 dispenses liquid fusing agent 62 onto layer 92 in a pattern 94 corresponding to an object slice. Patterned build material 94 irradiated with fusing light 18 behind the carriage 44b fuses to form fused build material 96. When the third pass is complete, the dispenser 40 on carriage 44b is parked on the pen service side 54 and the roller 42 on carriage 44a remains parked on the non-service side 60 in the retracted position in preparation for spreading a next layer.

After the roller 42 and dispenser 40 are parked on opposite sides of the work area 16, as shown in processing stage 90d of layering process 88 (FIG. 12), the amount of fusing energy/light 18 the left side object 72 has received is greater than the amount of fusing energy/light 18 the right side object 70 has received. The non-uniform exposure is due to the liquid fusing agent 62 being dispensed from the left side 60 to the right side 54 and the fusing light 18 being blocked by carriage 44b during processing stage 90c. This non-uniform exposure to fusing light 18 across the first layer 92, between the right side object 70 and the left side object 72, is evened out or made uniform during processing stage 90e in a fourth pass over the work area 16 as a next layer 94 is spread by deployed roller 42. During this fourth pass, the left side object 72 is being covered with the next layer 94 while the right side object 70 continues to receive fusing light 18. At constant pass-over carriage speeds, and constant fusing lamp 26 power, the reduced amount of fusing light exposure the left side object 72 received in the third pass compared to the right side object 72, is made up for, or evened out during the fifth pass. The layering process 76 shown in FIG. 11 can continue in this manner until the object is completed.

In some examples, the carriages 44a and 44b can remain parked on opposite sides of the work area 16 as shown in processing stage 90d, after processing stage 90c is complete, in order to provide a delay period which gives additional time for the exposed layer 92 to be irradiated with fusing light 18 which can enable adequate time to achieve a desired reptation of fused build material 96. Inserting such a delay period into the layering process 88 may be appropriate, for example, in circumstances where there is a reduced power level from lamps 26 within the stationary energy system 12.

FIGS. 13-18 are flow diagrams showing example methods 100, 110, 130, 140, 164, and 176, of fusing a 3D object layer. Methods 110, 140, and 176 comprise, respectively, extensions of methods 100, 130, and 164, and thereby incorporate additional details of methods 100, 130, and 164. The methods are associated with examples discussed above with regard to FIGS. 1-12, and details of the operations shown in the methods can be found in the related discussion of such examples. The operations of the methods may be embodied as programming instructions stored on a memory of controller 14 and executable on controller 14.

Figure 13:
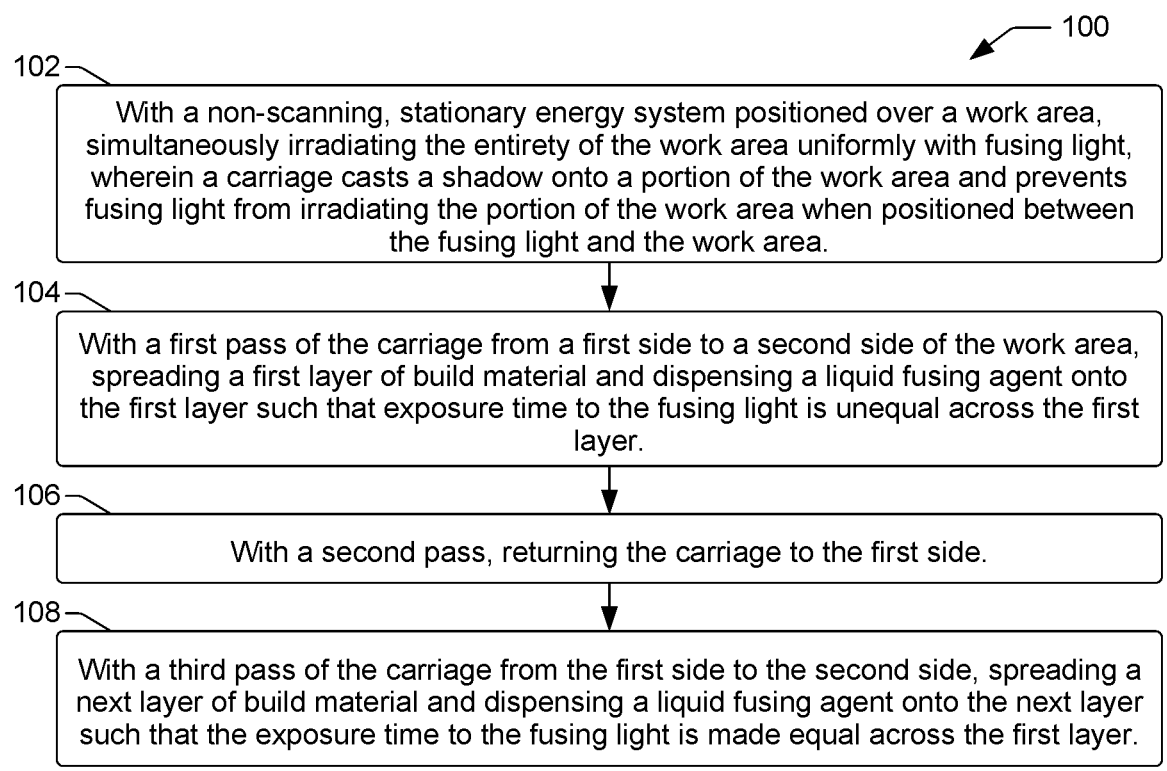

Referring to the flow diagram of FIG. 13, an example method 100 of fusing a 3D object layer begins at block 102. With a non-scanning, stationary energy system positioned over a work area, the entirety of the work area is simultaneously and uniformly irradiated with fusing light, wherein a carriage casts a shadow onto a portion of the work area and prevents fusing light from irradiating the portion of the work area when positioned between the fusing light and the work area (block 102). With a first pass of the carriage from a first side to a second side of the work area, a first layer of build material is spread and a liquid fusing agent is dispensed onto the first layer such that exposure time to the fusing light is unequal across the first layer (block 104). The carriage is then returned to the first side with a second pass (block 106). The method includes, with a third pass of the carriage from the first side to the second side, spreading a next layer of build material and dispensing a liquid fusing agent onto the next layer such that the exposure time to the fusing light is made equal across the first layer (block 108).

Figure 14:
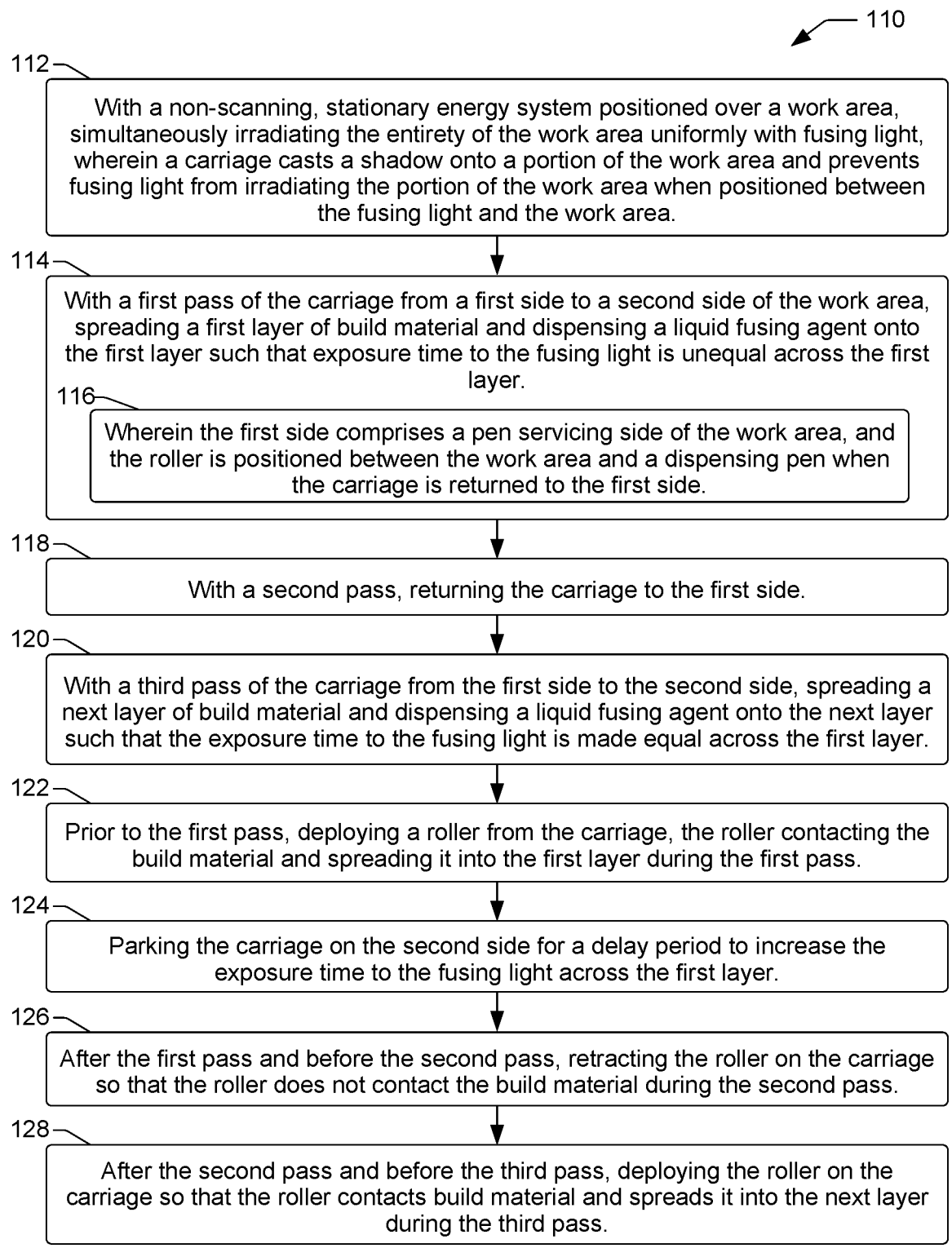

Referring to the flow diagram of FIG. 14, another method 110 of fusing a 3D object layer begins at block 112. With a non-scanning, stationary energy system positioned over a work area, the entirety of the work area is simultaneously and uniformly irradiated with fusing light, wherein a carriage casts a shadow onto a portion of the work area and prevents fusing light from irradiating the portion of the work area when positioned between the fusing light and the work area (block 112). With a first pass of the carriage from a first side to a second side of the work area, a first layer of build material is spread and a liquid fusing agent is dispensed onto the first layer such that exposure time to the fusing light is unequal across the first layer (block 114). In some examples, the first side comprises a pen servicing side of the work area, and the roller is positioned between the work area and a dispensing pen when the carriage is returned to the first side (block 116). The carriage is then returned to the first side with a second pass (block 118). The method includes, with a third pass of the carriage from the first side to the second side, spreading a next layer of build material and dispensing a liquid fusing agent onto the next layer such that the exposure time to the fusing light is made equal across the first layer (block 120). The method includes, prior to the first pass, deploying a roller from the carriage, the roller contacting the build material and spreading it into the first layer during the first pass (block 122). In some examples, the method includes parking the carriage on the second side for a delay period to increase the exposure time to the fusing light across the first layer (block 124). After the first pass and before the second pass, the roller on the carriage is retracted so that the roller does not contact the build material during the second pass (block 126). After the second pass and before the third pass, the roller on the carriage is deployed so that the roller contacts build material and spreads it into the next layer during the third pass (block 128).

Figure 15:
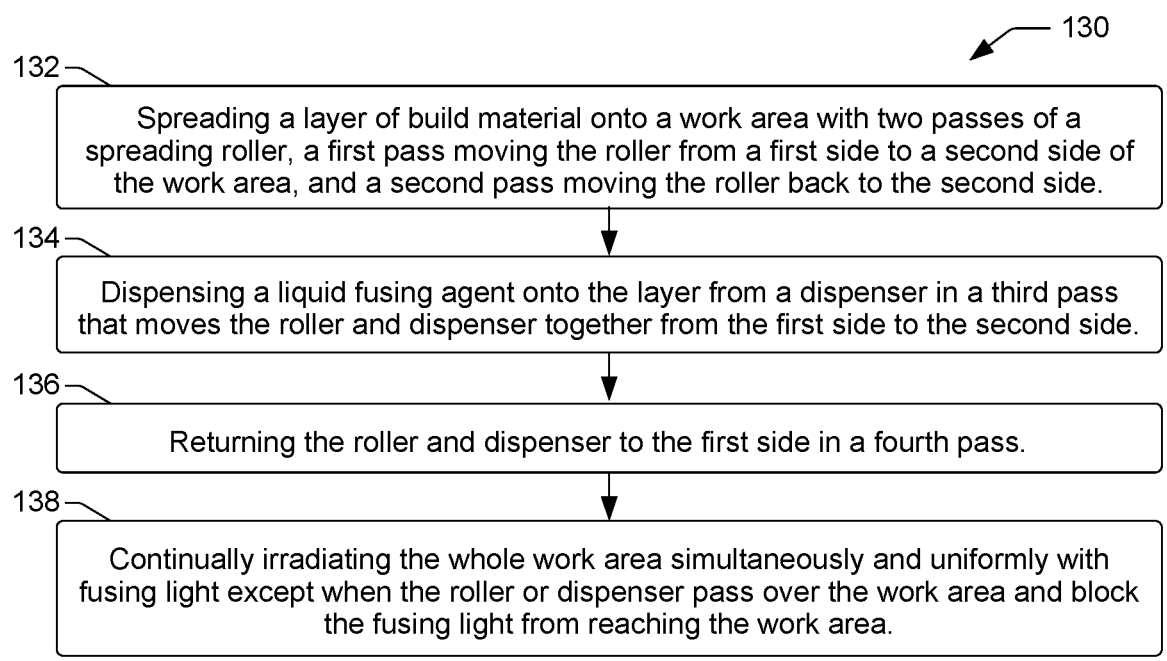

Referring to the flow diagram of FIG. 15, another method 130 of fusing a 3D object layer begins at block 132. The method includes spreading a layer of build material onto a work area with two passes of a spreading roller, a first pass moving the roller from a first side to a second side of the work area, and a second pass moving the roller back to the second side (block 132), dispensing a liquid fusing agent onto the layer from a dispenser in a third pass that moves the roller and the dispenser together from the first side to the second side (block 134), returning the roller and dispenser to the first side in a fourth pass (block 136), and continually irradiating the whole work area simultaneously and uniformly with fusing light except when the roller or dispenser pass over the work area and block the fusing light from reaching the work area (block 138).

Figure 16:
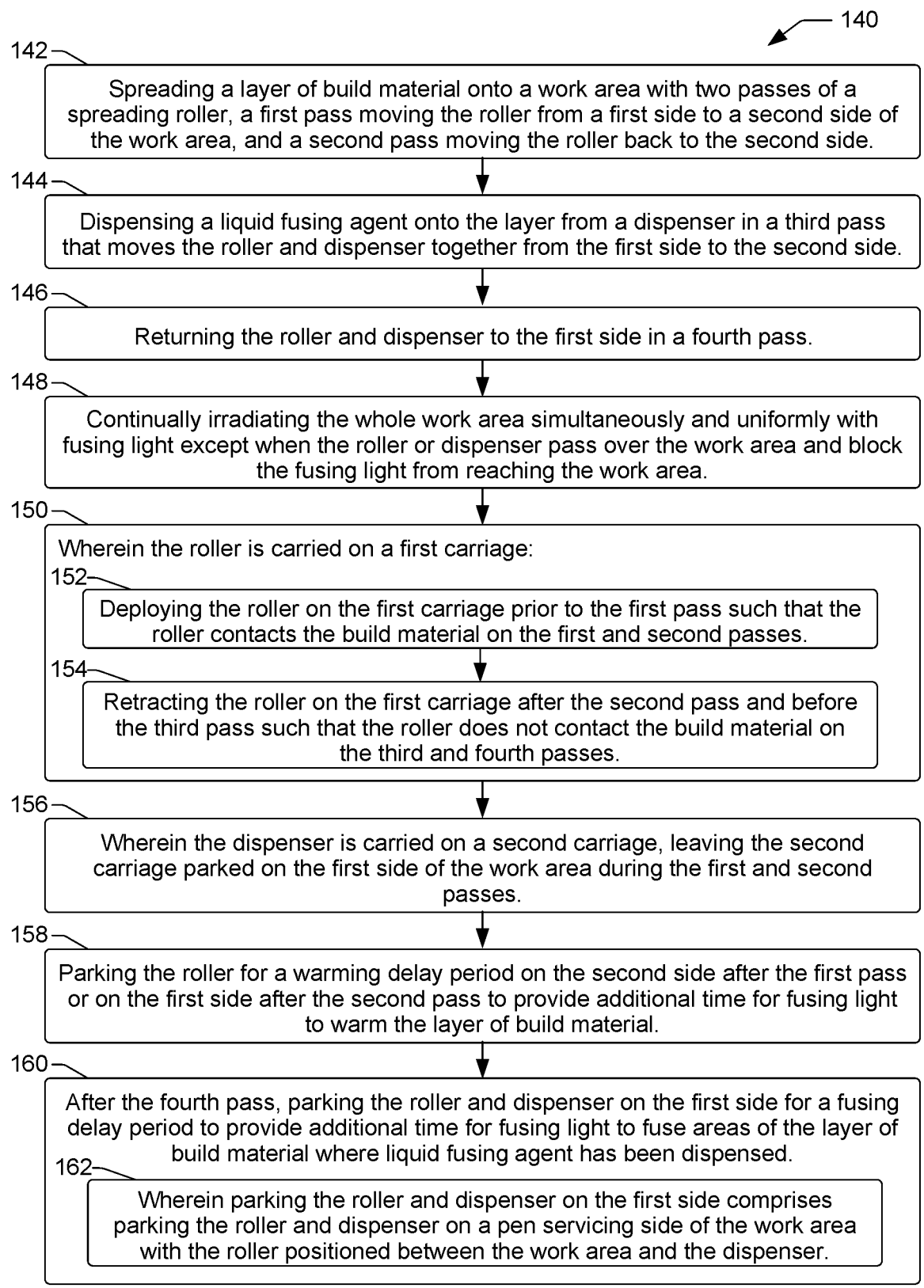

Referring to the flow diagram of FIG. 16, another method 140 of fusing a 3D object layer begins at block 132. As noted above, method 140 is an extension of method 130. The first several operations of method 140 mirror the operations of method 130 noted above. Thus, the method 140 includes spreading a layer of build material onto a work area with two passes of a spreading roller, a first pass moving the roller from a first side to a second side of the work area, and a second pass moving the roller back to the second side (block 142), dispensing a liquid fusing agent onto the layer from a dispenser in a third pass that moves the roller and the dispenser together from the first side to the second side (block 144), returning the roller and dispenser to the first side in a fourth pass (block 146), and continually irradiating the whole work area simultaneously and uniformly with fusing light except when the roller or dispenser pass over the work area and block the fusing light from reaching the work area (block 148). The method 140 continues with, wherein the roller is carried on a first carriage (block 150), deploying the roller on the first carriage prior to the first pass such that the roller contacts the build material on the first and second passes (block 152), and retracting the roller on the first carriage after the second pass and before the third pass such that the roller does not contact the build material on the third and fourth passes (block 154). The method includes, wherein the dispenser is carried on a second carriage, leaving the second carriage parked on the first side of the work area during the first and second passes (block 156). In some examples, the method includes parking the roller for a warming delay period on the second side after the first pass or on the first side after the second pass to provide additional time for fusing light to warm the layer of build material (block 158). The method includes, after the fourth pass, parking the roller and dispenser on the first side for a fusing delay period to provide additional time for fusing light to fuse areas of the layer of build material where liquid fusing agent has been dispensed (block 160), and in some examples parking the roller and dispenser on the first side comprises parking the roller and dispenser on a pen servicing side of the work area with the roller positioned between the work area and the dispenser (block 162).

Figure 17:
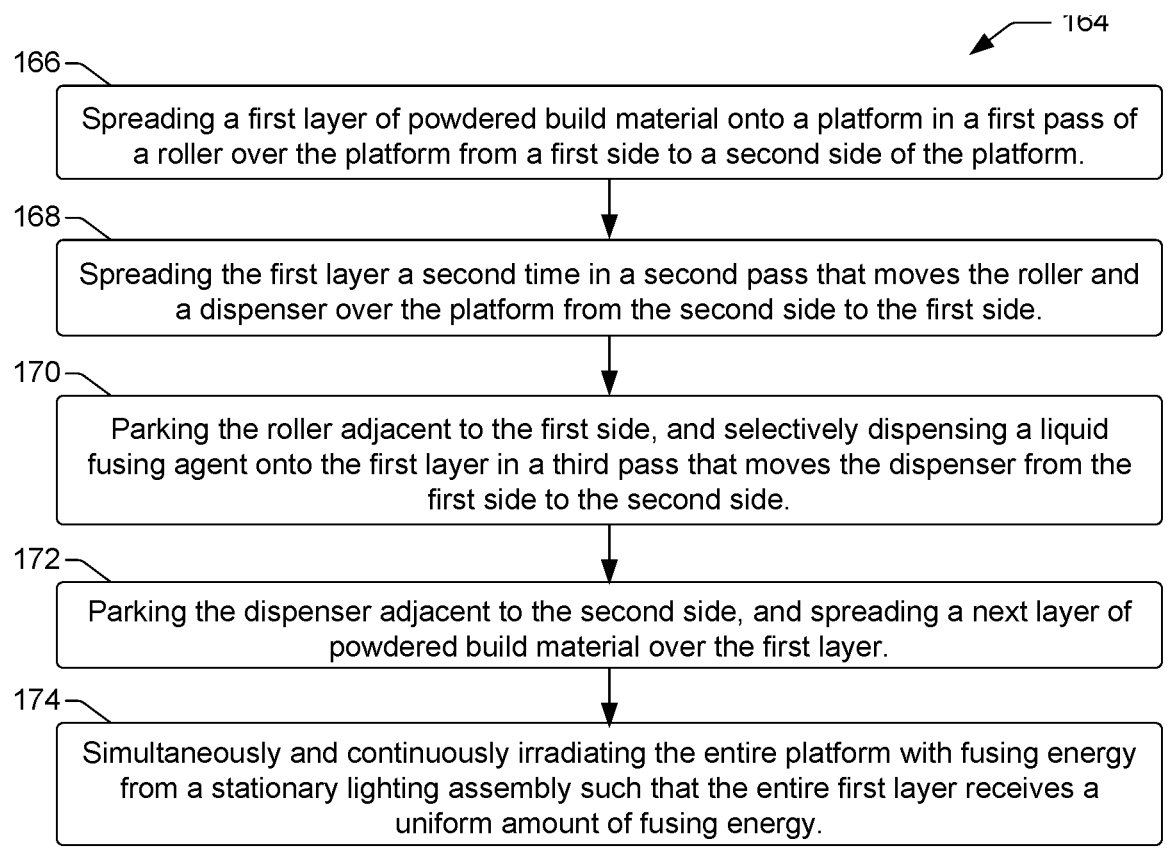
Figure 18:
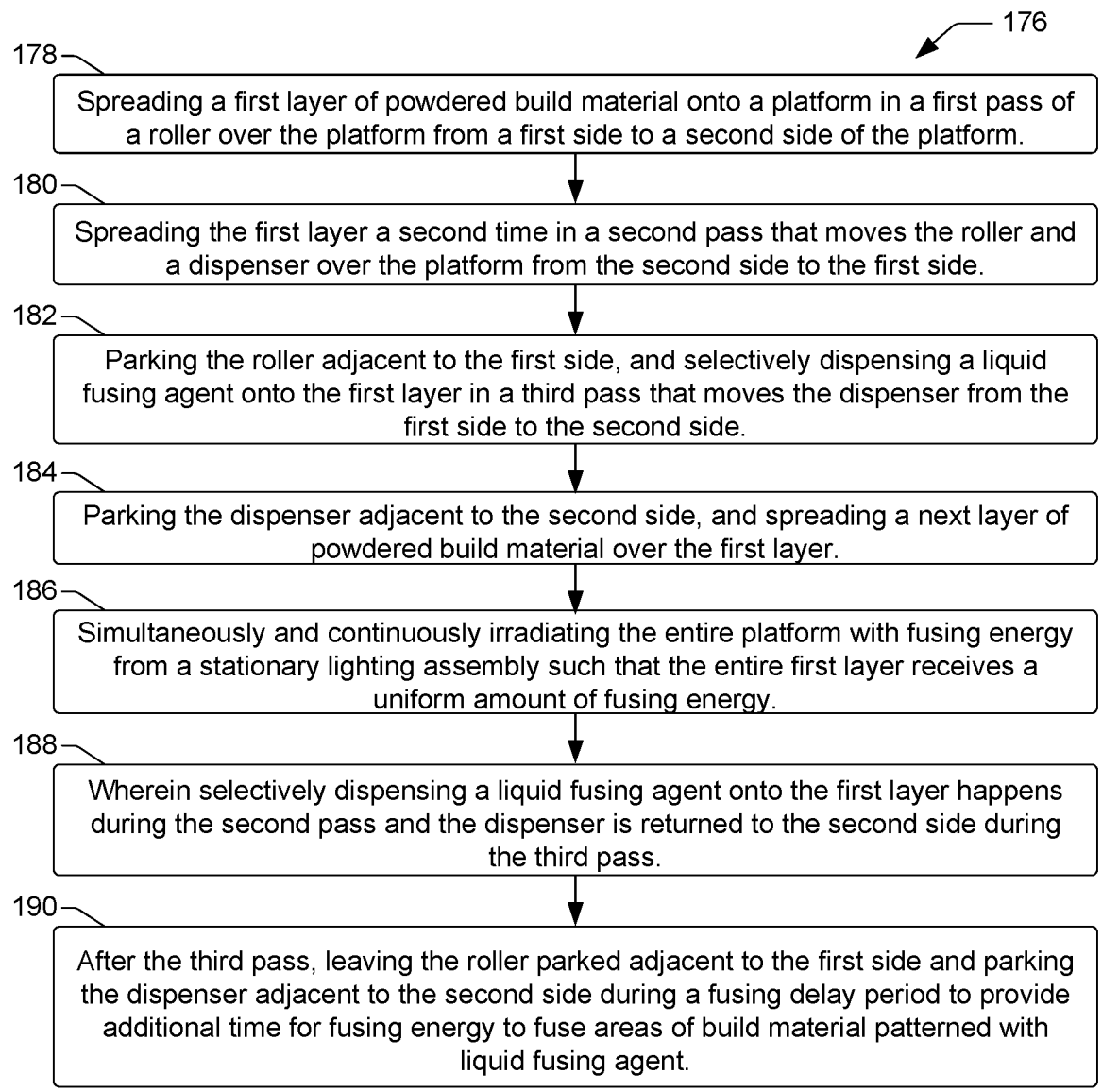

Referring to the flow diagram of FIG. 17, a method 164 of fusing with a stationary lighting assembly begins at block 166. The method includes spreading a first layer of powdered build material onto a platform in a first pass of a roller over the platform from a first side to a second side of the platform (block 166), spreading the first layer a second time in a second pass that moves the roller and a dispenser over the platform from the second side to the first side (block 168), parking the roller adjacent to the first side, and selectively dispensing a liquid fusing agent onto the first layer in a third pass that moves the dispenser from the first side to the second side (block 170), parking the dispenser adjacent to the second side, and spreading a next layer of powdered build material over the first layer (block 172), and simultaneously and continuously irradiating the entire platform with fusing energy from a stationary lighting assembly such that the entire first layer receives a uniform amount of fusing energy (block 174).

Referring to the flow diagram of FIG. 16, another method 176 of fusing with a stationary lighting assembly a 3D object layer begins at block 178. As noted above, method 176 is an extension of method 164. The first several operations of method 176 mirror the operations of method 164 noted above. Thus, the method 176 includes spreading a first layer of powdered build material onto a platform in a first pass of a roller over the platform from a first side to a second side of the platform (block 178), spreading the first layer a second time in a second pass that moves the roller and a dispenser over the platform from the second side to the first side (block 180), parking the roller adjacent to the first side, and selectively dispensing a liquid fusing agent onto the first layer in a third pass that moves the dispenser from the first side to the second side (block 182), parking the dispenser adjacent to the second side, and spreading a next layer of powdered build material over the first layer (block 184), and simultaneously and continuously irradiating the entire platform with fusing energy from a stationary lighting assembly such that the entire first layer receives a uniform amount of fusing energy (block 186). The method 176 continues at block 188 and includes selectively dispensing a liquid fusing agent onto the first layer during the second pass and returning the dispenser to the second side during the third pass (block 188). The method can include, after the third pass, leaving the roller parked adjacent to the first side and parking the dispenser adjacent to the second side during a fusing delay period to provide additional time for fusing energy to fuse areas of build material patterned with liquid fusing agent (block 190).

What is claimed is:

1. A method of fusing a 3D object layer comprising:
    with a non-scanning, stationary energy system positioned over a work area, simultaneously irradiating the entirety of the work area uniformly with fusing light, wherein a carriage casts a shadow onto a portion of the work area and prevents fusing light from irradiating the portion of the work area when positioned between the fusing light and the work area;
    while moving the carriage at a constant speed from a first side to a second side of the work area in one pass, dispensing a liquid fusing agent onto a first layer of a build material in a pattern corresponding to an object slice, such that an exposure time of the patterned build material in the first layer to the fusing light is unequal across the first layer; and
    while moving the carriage from the first side to the second side of the work area in another pass at the constant speed, spreading a next layer of the build material over the first layer, such that the exposure time of the patterned build material in the first layer to the fusing light is made equal across the first layer.

2. A method as in claim 1, wherein the carriage comprises:
    a first carriage casting a first shadow and moving at the constant speed for the one pass; and
    a second carriage casting a second shadow the same as the first shadow and moving at the constant speed for the other pass.

3. A method as in claim 1, wherein:
    the carriage is a single carriage;
    the one pass is a first pass;
    the other pass is a third pass; and
    the method further comprises returning the carriage to the first side of the work area in a second pass between the first pass and the third pass.

4. A method as in claim 1, further comprising spreading the first layer over the work area while moving the carriage from the first side to the second side of the work area in the one pass.

5. A method as in claim 4, further comprising dispensing the liquid fusing agent onto the next layer while moving the carriage from the first side to the second side of the work area in the other pass.

6. A method as in claim 1, wherein:
    the carriage comprises a first carriage for dispensing the liquid fusing agent and a second carriage for spreading the next layer of the build material; and
    the first and second carriages move together in the one pass and in the other pass.

7. A fusing system for an additive manufacturing machine, comprising:
    a movable platform to support a work area, the platform movable incrementally lower to accommodate a succession of layers of a build material;
    a spreader to spread the build material in layers over the work area;
    a dispenser to selectively dispense a liquid fusing agent on to the layers of the build material;
    a carriage carrying the spreader and the dispenser, the carriage movable back and forth over the work area;
    a non-scanning, stationary energy system positioned over the work area to simultaneously irradiating the entirety of the work area uniformly with fusing light, wherein the carriage casts a shadow onto a portion of the work area and prevents fusing light from irradiating the portion of the work area when positioned between the fusing light and the work area; and a controller programmed to:

while causing the carriage to move at a constant speed from a first side to a second side of the work area in one pass, cause the dispenser to dispense the liquid fusing agent onto a first layer of the build material in a pattern corresponding to an object slice, such that an exposure time of the patterned build material in the first layer to the fusing light is unequal across the first layer; and while causing the carriage to move at the constant speed from the first side to the second side of the work area in another pass, cause the spreader to spread a next layer of the build material over the first layer, such that the exposure time of the patterned build material in the first layer to the fusing light is made equal across the first layer.

8. A fusing system as in claim 7, wherein:

the carriage comprises:

a first carriage carrying the dispenser and casting a first shadow; and a second carriage carrying the spreader and casting a second shadow the same as the first shadow; and the controller is programmed to:

while causing the first carriage to move at the constant speed from the first side to the second side of the work area in one pass, cause the dispenser to dispense the liquid fusing agent onto the first layer of the build material in the pattern corresponding to an object slice, such that the exposure time of the patterned build material in the first layer to the fusing light is unequal across the first layer; and while causing the second carriage to move at the constant speed from the first side to the second side of the work area in the other pass, cause the spreader to spread the next layer of the build material over the first layer, such that the exposure time of the patterned build material in the first layer to the fusing light is made equal across the first layer.

9. A system as in claim 7, wherein the carriage is a single carriage carrying the spreader and the dispenser.

10. A system as in claim 7, wherein the controller is programmed to cause the spreader to spread the first layer over the work area while the carriage is moving the carriage from the first side to the second side of the work area in the one pass.

11. A system as in claim 10, wherein the controller is programmed to cause the dispenser to dispense the liquid fusing agent onto the next layer while the carriage is moving from the first side to the second side of the work area in the other pass.

12. A system as in claim 7, wherein:

the carriage comprises a first carriage carrying the dispenser and a second carriage carrying the spreader; and the first and second carriages are movable together in the one pass and in the other pass.

* * * * *